(12) United States Patent
Noguchi

(10) Patent No.: US 10,084,544 B2
(45) Date of Patent: Sep. 25, 2018

(54) OPTICAL RELAY DEVICE, CONTROL METHOD, AND OPTICAL TRANSMISSION SYSTEM

(71) Applicant: MITSUBISHI ELECTRIC CORPORATION, Tokyo (JP)

(72) Inventor: Yuita Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/736,065

(22) PCT Filed: Dec. 21, 2015

(86) PCT No.: PCT/JP2015/085662
§ 371 (c)(1),
(2) Date: Dec. 13, 2017

(87) PCT Pub. No.: WO2017/109830
PCT Pub. Date: Jun. 29, 2017

(65) Prior Publication Data
US 2018/0191441 A1    Jul. 5, 2018

(51) Int. Cl.
*H04J 14/00* (2006.01)
*H04B 10/12* (2006.01)
(Continued)

(52) U.S. Cl.
CPC ............ *H04B 10/294* (2013.01); *H04J 14/02* (2013.01); *H04J 14/0212* (2013.01); *H04J 14/06* (2013.01); *H04B 10/00* (2013.01); *H04B 10/079* (2013.01)

(58) Field of Classification Search
CPC .. H04B 10/294; H04B 10/032; H04B 10/079; H04B 10/08; H04B 10/17; H04J 14/0212; H04J 14/02; H04J 14/06
(Continued)

(56) References Cited

U.S. PATENT DOCUMENTS 5,801,861 A * 9/1998 Majima ................ H04B 10/506
398/1
6,587,239 B1 * 7/2003 Hung ...................... H04J 14/02
398/79
(Continued)

FOREIGN PATENT DOCUMENTS

JP      2006-33542 A      2/2006
JP      2010-541478 A     12/2010
(Continued)

OTHER PUBLICATIONS

Decision of a Patent Grant of Japan Patent Application No. 2016-537594 issue dated Nov. 11, 2016.
(Continued)

*Primary Examiner* — Ken N Vanderpuye
*Assistant Examiner* — Abbas H Alagheband
(74) *Attorney, Agent, or Firm* — Birch, Stewart, Kolasch & Birch, LLP

(57) ABSTRACT

An optical relay device includes a WSS functioning as a wavelength selective switch capable of performing path switching in wavelength units and optical level adjustment for each of wavelengths and a control device that instructs, on the basis of a fluctuation amount of an optical level for each of the wavelengths of an optical signal output from the WSS and setting information indicating, for each of the wavelengths, whether optical level adjustment for the wavelengths of the optical signal is enabled, the WSS to perform a setting change of an optical level adjustment amount of the optical signal.

11 Claims, 7 Drawing Sheets

(51) Int. Cl.
*H04B 17/00* (2015.01)
*H04B 10/20* (2006.01)
*H04B 10/294* (2013.01)
*H04J 14/02* (2006.01)
*H04J 14/06* (2006.01)
*H04B 10/079* (2013.01)
*H04B 10/00* (2013.01)

(58) Field of Classification Search
USPC .......................... 398/48, 201, 32, 33, 49, 63
See application file for complete search history.

(56) References Cited

U.S. PATENT DOCUMENTS

| | | | | |
|---|---|---|---|---|
| 6,903,324 | B2* | 6/2005 | Tomofuji | ........... H04B 10/2942 |
| | | | | 250/214 LA |
| 7,515,829 | B2* | 4/2009 | Mori | .................... H04J 14/0221 |
| | | | | 398/94 |
| 8,098,988 | B2* | 1/2012 | Nakazato | ............. G02B 6/2931 |
| | | | | 398/25 |
| 8,135,280 | B2 | 3/2012 | Zong et al. | |
| 8,170,417 | B2* | 5/2012 | Liu | ..................... H04J 14/0204 |
| | | | | 398/33 |
| 8,615,167 | B2 | 12/2013 | Sugaya et al. | |
| 8,798,463 | B2* | 8/2014 | Komiya | ........... H04B 10/07955 |
| | | | | 398/34 |
| 9,054,832 | B2* | 6/2015 | Barnard | ............... H04B 10/572 |
| 9,136,970 | B2* | 9/2015 | Wellbrock | ......... H04B 10/0799 |
| 9,191,143 | B2* | 11/2015 | Yamakami | .......... H04J 14/0221 |
| 9,225,459 | B2* | 12/2015 | Oda | .................... H04J 14/0221 |
| 9,319,131 | B2* | 4/2016 | Maggiari | ............. H04B 10/032 |
| 9,419,743 | B2* | 8/2016 | Barnard | ............... H04B 10/572 |
| 9,485,050 | B2* | 11/2016 | Barnard | ............... H04B 10/572 |
| 9,641,278 | B2* | 5/2017 | Barnard | ............... H04J 14/0287 |
| 9,647,789 | B2* | 5/2017 | Miyazaki | .............. H04J 14/021 |
| 9,673,929 | B2* | 6/2017 | Yamashita | .......... H04J 14/0221 |
| 9,917,642 | B2* | 3/2018 | Costantini | ........ H04B 10/07955 |
| 2004/0008989 | A1 | 1/2004 | Hung | ..................... H04J 14/02 |
| | | | | 398/69 |
| 2006/0029391 | A1* | 2/2006 | Yuki | ................... H04J 14/0221 |
| | | | | 398/45 |
| 2006/0110162 | A1* | 5/2006 | Tian | .................... H04J 14/0204 |
| | | | | 398/83 |
| 2008/0267631 | A1 | 10/2008 | Collings et al. | |
| 2009/0297149 | A1* | 12/2009 | Nakazato | ............. G02B 6/2931 |
| | | | | 398/79 |
| 2011/0116790 | A1* | 5/2011 | Sakauchi | ............ H04J 14/0204 |
| | | | | 398/5 |
| 2012/0263459 | A1* | 10/2012 | Komiya | ........... H04B 10/07955 |
| | | | | 398/34 |
| 2013/0121691 | A1* | 5/2013 | Oda | .................... H04J 14/0221 |
| | | | | 398/34 |
| 2013/0302028 | A1* | 11/2013 | Barnard | ............... H04B 10/572 |
| | | | | 398/25 |
| 2014/0233943 | A1* | 8/2014 | Yamakami | .......... H04J 14/0221 |
| | | | | 398/34 |
| 2014/0355981 | A1* | 12/2014 | Miyazaki | .............. H04J 14/021 |
| | | | | 398/38 |
| 2016/0028503 | A1 | 1/2016 | Costantini | |
| 2016/0094307 | A1* | 3/2016 | Nakamura | .......... H04J 14/0221 |
| | | | | 398/26 |
| 2017/0047990 | A1* | 2/2017 | Kawaguchi | ........ H04B 10/0775 |

FOREIGN PATENT DOCUMENTS

| | | |
|---|---|---|
| JP | 2012-65060 A | 3/2012 |
| JP | 2012-222747 A | 11/2012 |
| JP | 2014-93565 A | 5/2014 |
| JP | 2014-165543 A | 9/2014 |
| JP | 5633266 B2 | 12/2014 |
| WO | WO 2014/139557 A1 | 9/2014 |

OTHER PUBLICATIONS

Examiner Date signature /Abbas H Alagheband/ Considered Apr. 03, 2018 - ExAmINER:Initai if reference considered, whether or not citation is in conformance with ktiPEP 609. Draw line through citation if not in conformance and not considered. Include copy of this form with next communication to applicant. 1. Applicants unique citation designation number. (optional) 2. Applicant is to place a check mark here if English language Translation ;s attached. This collection of information is required by 37 Cfr 1.97 and 1.98. The information is required to obtain or retain a benefit by the public which is to file (and by the Uspto to process) an application. Confidentiality is governed by 35 U.S.C. 122 and 37 Cfr 1.14. This co lection is estimated to take 2 hours to complete, including gathering, preparing, arid submitting the completed application form the Uspto. Time will vary depending upon the individual case. Any comments on the amount of time you require to complete this form and/or suggestions for reducing this burden, should be sent to the Cheif Information Officer, U.S. Patent and Trademark Office, Ro. Pox 1450 Alexandria. Va 22313-1450. Do Not Send I-E.1:::S or Completed Forms to This Address.

ITU-T G.694.1, "Series G: Transmission Systems and Media, Digital Systems and Networks", Feb. 2012, Total 13 pages.

* cited by examiner

OPTICAL RELAY DEVICE, CONTROL METHOD, AND OPTICAL TRANSMISSION SYSTEM

FIELD

The present invention relates to an optical relay device, a control method, and an optical transmission system for relaying a wavelength-multiplexed optical signal.

BACKGROUND

An increase in the capacity of information communication has been realized by a wavelength-multiplexing optical transmission system. The wavelength-multiplexing optical system is called Wavelength Division Multiplexing (WDM) system as well. In recent years, the capacity of information transmitted and received by one terminal increases according to improvement of the performance of communication terminals such as a smartphone. There is a request for a further increase in the capacity of the information communication. For the purpose of realizing improvement of reliability for communication paths and communication devices, there is an increasing request for network flexibility for optimizing a network configuration according to demands. To meet these requests, a multi-way WDM system adapted to a flexible grid specified in Non Patent Literature 1 is put to practical use. In the multi-way WDM system adapted to the flexible grid, it is possible to change bandwidths of wavelengths.

In the WDM system, deterioration of an optical transmission characteristic is prevented by a function of adjusting an optical level of each of the wavelengths to a specified value. This function is called, for example, dynamic gain control as well. As an example of the conventional WDM system, Patent Literature 1 describes a WDM optical transmission system that adjusts an optical level on a transmission side for each of wavelengths such that a signal characteristic at a reception end is optimized.

As influence due to level fluctuation, when the optical level rises, the influence of a nonlinear phenomenon increases and, when the optical level falls, an optical signal to noise ratio (OSNR) is deteriorated. These deteriorate the signal characteristic. A transmission distance is reduced by the signal characteristic deterioration.

CITATION LIST

Patent Literature

Patent Literature 1: Japanese Patent No. 5633266

Non Patent Literature

Non Patent Literature 1: ITU-T G.694.1

SUMMARY

Technical Problem

In the multi-way WDM system adapted to the flexible grid, in general, a wavelength selective switch (WSS) capable of switching a path in wavelength units is used. In addition to a function of switching a path of an input optical signal, the WSS has a function of performing multiplexing and demultiplexing of a wavelength and a function of individually attenuating optical levels of wavelengths at transmittance set for each of the wavelengths when the wavelengths are transmitted through an output port. In the dynamic gain control in the multi-way WDM system including the WSS, the WSS controls to align the optical levels of the wavelengths using the function of individually attenuating the optical levels of the wavelengths. As explained above, in the WDM system including the multi-way WDM system, when fluctuation in an optical level occurs, a signal characteristic is deteriorated and signal transmission quality is deteriorated. It is undesirable that a state in which the signal transmission quality is deteriorated lasts long. Therefore, it is desired to adjust a required time from occurrence of the fluctuation in the optical level until return to a specified optical level, that is, optical levels of wavelengths to realize a reduction in a required time of operation for returning the optical level to the specified level. When the fluctuation in the optical level occurs, if a required time until a wavelength in which the optical level fluctuates is returned to the specified optical level is reduced, the signal transmission quality of the entire system is improved.

The present invention has been devised in view of the above, and an object of the present invention is to obtain an optical relay device capable of reducing a required time from detection of optical level fluctuation until completion of adjustment of the optical level and improving signal transmission quality in an optical transmission system.

Solution to Problem

To solve the problem and achieve the object, an optical relay device according to the present invention includes a wavelength selective switch capable of performing path switching in wavelength units and optical level adjustment for each of wavelengths. The optical relay device includes a control device that instructs, on the basis of a fluctuation amount of an optical level for each of the wavelengths of an optical signal output from the wavelength selective switch and setting information indicating, for each of the wavelengths, whether optical level adjustment for the wavelengths of the optical signal is enabled, the wavelength selective switch to perform a setting change of an optical level adjustment amount of the optical signal.

Advantageous Effects of Invention

The optical relay device according to the present invention achieves an effect that it is possible to reduce a required time from detection of optical level fluctuation until completion of adjustment of the optical level and improve signal transmission quality in an optical transmission system.

DESCRIPTION OF EMBODIMENTS

Optical relay devices, control methods, and optical transmission systems according to embodiments of the present invention are explained in detail below with reference to the drawings. Note that the present invention is not limited by the embodiments.

First Embodiment

Figure 1:
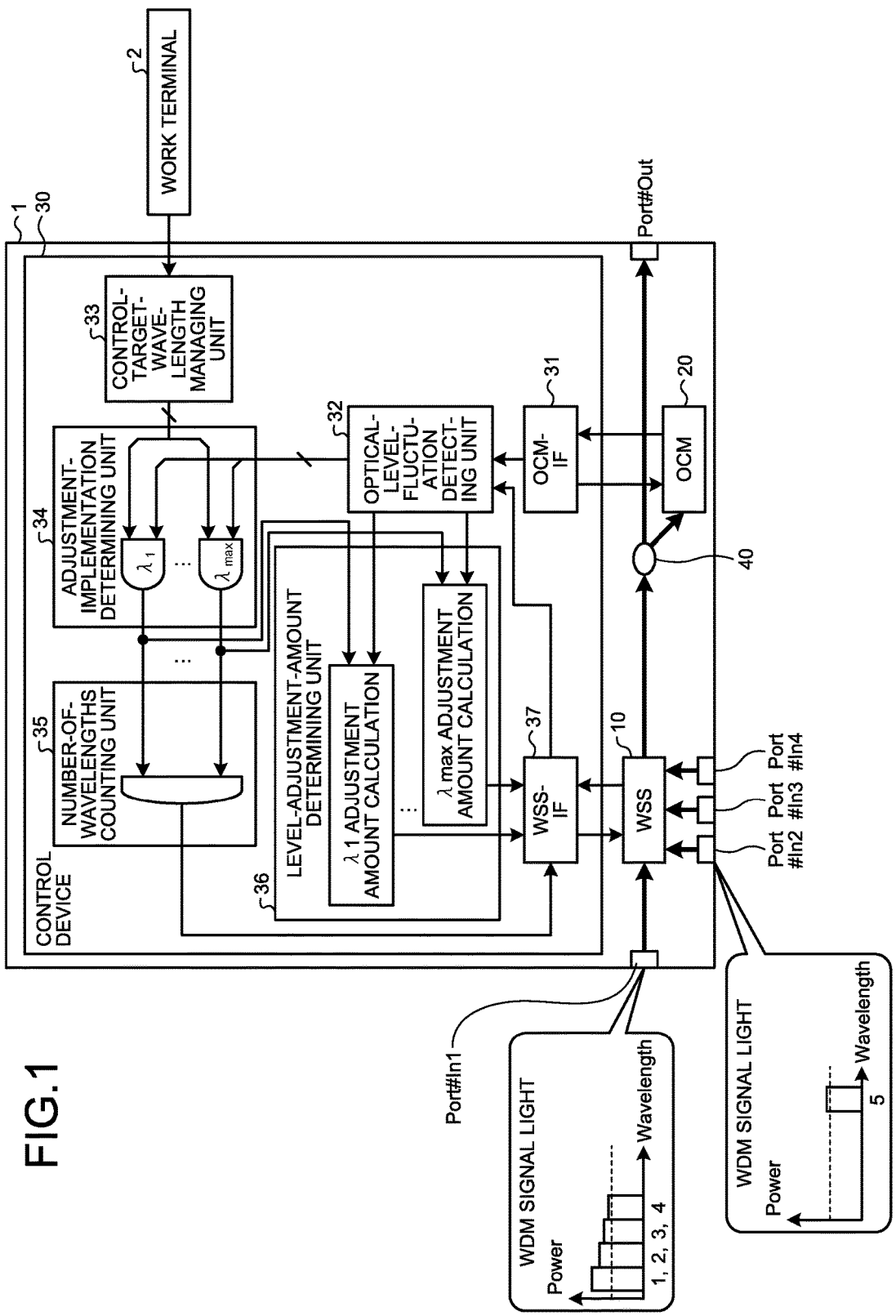
FIG. 1 is a diagram illustrating a configuration example of an optical relay device according to a first embodiment of the present invention.

FIG. 1 is a diagram illustrating a configuration example of an optical relay device according to a first embodiment of the present invention. An optical relay device 1 according to this embodiment includes a WSS 10, which is a wavelength selective switch, an optical channel monitor (OCM) 20, and a control device 30 that controls the WSS 10 and the OCM 20. The optical relay device 1 is applied to a wavelength-multiplexing optical transmission system and is capable of realizing a multi-way WDM system adapted to a flexible grid. The optical relay device 1 includes four input ports (Port #In1 to Port #In4) and one output port (Port #Out).

The WSS 10 illustrated in FIG. 1 is a wavelength selective switch including four ports. A maximum number of multiplexed wavelengths of the WSS 10 is set to eighty. The WSS 10 can optionally change a relation between the wavelengths and the ports and can also optionally change wavelengths transmitted through the ports. The WSS 10 can optionally change bands of the wavelengths transmitted through the ports. Further, the WSS 10 is capable of individually attenuating and adjusting, for each of the wavelengths, optical levels of the wavelengths transmitted through the ports.

In the optical relay device 1 illustrated in FIG. 1, WDM signal lights, which are wavelength-multiplexed signal lights, are input to the WSS 10 from the Ports #In1, #In2, #In3, and #In4. The WSS 10 multiplexes the input WDM signal lights and outputs the WDM signal lights from the Port #Out via an optical splitter 40. The WSS 10 is set such that WDM signal light having any wavelength is input from any one of the Ports #In1, #In2, #In3, and #In4. As illustrated in FIG. 1, in this embodiment, the WSS 10 is set such that WDM signal lights having wavelengths λ1, λ2, and λ3 are input to the WSS 10 from the Port #In1 and WDM signal light having a wavelength λ5 is input to the WSS 10 from the Port #In2. The WSS 10 multiplexes the input WDM signal lights having the wavelengths λ1 to λ5. The WDM signal light output from the WSS 10 is divided to two paths by the optical splitter 40. One WDM signal light is output to the outside via the Port #Out. The other WDM signal light is input to the OCM 20. Note that, in the following explanation, WDM signal light having a wavelength λn (n=1, 2, 3) is sometimes simply described as "wavelength λn".

The OCM 20 is capable of separating input light for each of wavelengths and measuring optical levels of the wavelengths. The OCM 20 is capable of optionally changing a wavelength band. The OCM 20 measures optical levels of wavelengths output from the WSS 10 and received via the optical splitter 40. The OCM 20 repeatedly measures optical levels of received wavelengths.

The control device 30 includes an OCM-IF (interface) 31, an optical-level-fluctuation detecting unit 32, a control-target-wavelength managing unit 33, an adjustment-implementation determining unit 34, a number-of-wavelengths counting unit 35, a level-adjustment-amount determining unit 36, and a WSS-IF 37.

The OCM-IF 31 is an interface unit that connects the OCM 20 and the optical-level-fluctuation detecting unit 32. The OCM-IF 31 acquires information concerning optical levels of wavelengths from the OCM 20. For example, the OCM-IF 31 requests the OCM 20 to transmit information concerning an optical level and acquires the information concerning the optical level.

The optical-level-fluctuation detecting unit 32 detects fluctuation in an optical level on the basis of optical levels of wavelengths measured by the OCM 20. For example, the optical-level-fluctuation detecting unit 32 compares the optical level of each of the wavelengths and a specified optical level and calculates an optical level difference between the optical levels. The optical-level-fluctuation detecting unit 32 takes into account monitor accuracy of the OCM 20 and level adjustment accuracy of the WSS 10, when a comparison result, that is, the calculated level difference is α [dB] or more, determines that optical level fluctuation is present, and outputs information indicating that "optical level fluctuation is present" to the adjustment-implementation determining unit 34. When the comparison result is smaller than α [dB], the optical-level-fluctuation detecting unit 32 outputs information indicating that "optical level fluctuation is absent" to the adjustment-implementation determining unit 34 and the level-adjustment-amount determining unit 36. The optical-level-fluctuation detecting unit 32 determines, for each of the wavelengths, presence or absence of optical level fluctuation and outputs determination results of the wavelengths, that is, information indicating that "optical level fluctuation is present" or "optical level fluctuation is absent" to the adjustment-implementation determining unit 34. The optical-level-fluctuation detecting unit 32 notifies the optical levels of the wavelengths to the level-adjustment-amount determining unit 36.

The control-target-wavelength managing unit 33 manages information concerning wavelengths set as targets of the optical level adjustment, that is, the dynamic gain control. The control-target-wavelength managing unit 33 acquires setting information of the dynamic gain control for each of the wavelengths, that is, information indicating "optical level adjustment enabled" or "optical level adjustment disabled" from a work terminal 2 and retains the setting information. In FIG. 1, a configuration example is illustrated in which the work terminal 2 and the control-target-wavelength managing unit 33 of the optical relay device 1 are directly connected. However, a configuration can be adopted in which the work terminal 2 and the control-target-wavelength managing unit 33 are connected via a network.

The adjustment-implementation determining unit 34 determines, concerning each of the wavelengths set as the targets of the optical level adjustment, whether the optical level adjustment is necessary. Specifically, the adjustment-implementation determining unit 34 confirms the optical level fluctuation determination result ("optical level fluctuation is present" or "optical level fluctuation is absent") of the wavelengths input from the unit-optical-level-fluctuation detecting unit 32 and the setting information of the optical level adjustment ("optical level adjustment enabled" or "optical level adjustment disabled") for each of the wavelengths retained by the control-target-wavelength managing unit 33 and determines, as wavelengths for which the optical level adjustment is necessary, wavelengths, the optical levels of which fluctuate and the optical level adjustment for which is set to enabled. The adjustment-implementation determining unit 34 determines, as wavelengths for which the optical level adjustment is unnecessary, wavelengths other than the wavelengths, the optical levels of which fluctuate and the optical level adjustment is enabled. As illustrated in FIG. 1, the adjustment-implementation determining unit 34 can be realized by a plurality of AND circuits. That is, the adjustment-implementation determining unit 34 can be realized by a circuit that includes AND circuits as many as the number of wavelengths $\lambda_1$ to $\lambda_{max}$ processed by the optical relay device 1 and is configured to input, to the AND circuits, the determination result for each of the wavelengths output from the optical-level-fluctuation detecting unit 32 and the setting information, that is, the information indicating that optical level adjustment is enabled or disabled for each of the wavelengths output from the control-target-wavelength managing unit 33. The adjustment-implementation determining unit 34 outputs the determination results of the wavelengths to the number-of-wavelengths counting unit 35 and the level-adjustment-amount determining unit 36.

The number-of-wavelengths counting unit 35 confirms the determination results of the wavelengths input from the adjustment-implementation determining unit 34 and counts the number of wavelengths for which the optical level adjustment is necessary. When the number of wavelengths for which the optical level adjustment is necessary is zero, the number-of-wavelengths counting unit 35 notifies the WSS-IF 37 not to perform setting for the WSS 10. When the number of wavelengths for which the optical level adjustment is necessary is one or more, the number-of-wavelengths counting unit 35 notifies the WSS-IF 37 to perform setting for the WSS 10. Note that, although the control device 30 includes the number-of-wavelengths counting unit 35 that counts the number of wavelengths for which the optical level adjustment is necessary. However, the control device 30 can include, instead of the number-of-wavelengths counting unit 35, a processing unit that determines only presence or absence of wavelengths for which the optical level adjustment is necessary.

The level-adjustment-amount determining unit 36 receives optical levels of respective wavelengths $\lambda 1$ to $\lambda 80$ via the OCM-IF 31 and the optical-level-fluctuation detecting unit 32 and determines adjustment amounts of the optical levels of the wavelengths on the basis of the optical levels of the wavelengths and an expected optical level. The expected optical level is a target value of an optical level of WDM signal light output from the WSS 10. The level-adjustment-amount determining unit 36 calculates, for each of the wavelengths, differences between the optical levels of the wavelengths and the expected optical level and notifies the calculated differences to the WSS-IF 37 as adjustment amounts of the optical levels of the wavelengths. The level-adjustment-amount determining unit 36 can calculate adjustment amounts of the optical levels concerning only the wavelengths for which the optical level adjustment is determined as necessary by the adjustment-implementation determining unit 34. When the level-adjustment-amount determining unit 36 calculates adjustment amounts of the optical levels targeting only the wavelengths for which the optical level adjustment is determined as necessary, calculation processing is executed limitedly for a necessary minimum number of wavelengths. It is possible to suppress an increase in a processing load. Note that the level-adjustment-amount determining unit 36 can be realized by an arithmetic circuit that calculates adjustment amounts of the optical levels of the wavelengths. In this case, the level-adjustment-amount determining unit 36 can include arithmetic circuits as many as the number of wavelengths $\lambda_1$ to $\lambda_{max}$ processed by the optical relay device 1 and calculate adjustment amounts of the optical levels of the wavelengths in parallel or can include one arithmetic circuit and calculate adjustment amounts of the optical levels of the wavelengths in order. In FIG. 1, components described as "$\lambda 1$ adjustment amount calculation" to "$\lambda max$ adjustment amount calculation" correspond to the arithmetic circuits.

The WSS-IF 37 is an interface unit that connects the WSS 10 to the number-of-wavelengths counting unit 35 and the level-adjustment-amount determining unit 36. The WSS-IF 37 performs, for the WSS 10, setting concerning from which port of the Ports #In1 to #In4 each of the wavelengths $\lambda 1$ to $\lambda 80$ is input. The WSS-IF 37 operates as wavelength-selective-switch control unit and performs, for the WSS 10, setting of transmittances of the wavelengths output by the WSS 10. The transmittances are determined on the basis of the adjustment amounts of the optical levels for each of the wavelengths calculated by the level-adjustment-amount determining unit 36. The WSS-IF 37 can calculate transmittances of the wavelengths using a calculation formula for calculating transmittances from adjustment amounts of optical levels or can retain a correspondence table of adjustment amounts of optical levels and transmittances and determine transmittances of the wavelengths referring to the correspondence table. The WSS-IF 37 can determine transmittances of the wavelengths according to other methods. The WSS-IF 37 can calculate transmittances targeting only the wavelengths for which the optical level adjustment is determined as necessary by the adjustment-implementation determining unit 34 and set the transmittances in the WSS 10. Note that, although it is explained here that the WSS-IF 37 determines transmittances of the wavelengths, the level-adjustment-amount determining unit 36 can determine transmittances of the wavelengths. When the setting of the transmittances of the wavelengths output by the WSS 10 is changed, an attenuation amount of an optical signal output from the WSS 10 changes. It is possible to adjust an optical level of the output optical signal.

The control device 30 including the components explained above can be realized by a processing circuit configured by dedicated hardware (H/W) such as a field programmable gate array (FPGA), an application specific integrated circuit (ASIC), a single circuit, a composite circuit, a programmed processor, or a parallel-programmed processor. A part of the components of the control device 30 can be realized by dedicated hardware and the remaining components can be realized by software, firmware, or a combination of the software and the firmware.

Figure 2:
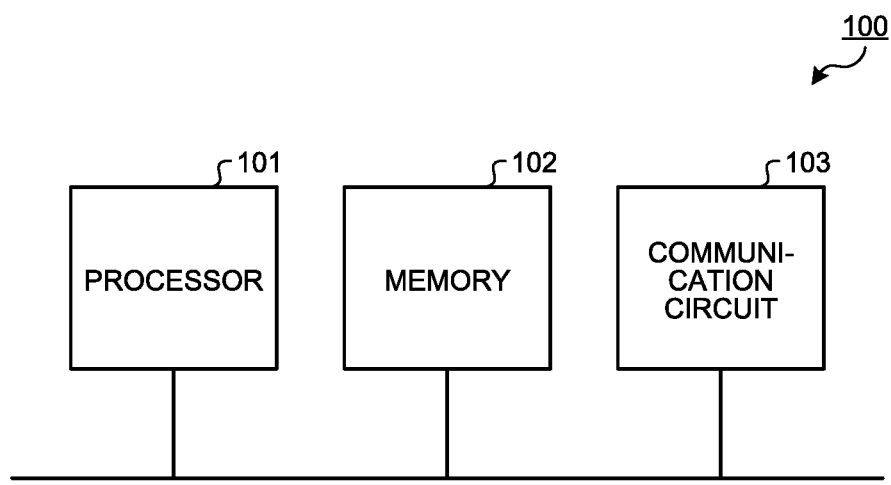
FIG. 2 is a diagram illustrating an example of a processing circuit that realizes a control device.

When a part of the components of the control device 30 is realized by software or the like, for example, a processing circuit 100 illustrated in FIG. 2 is used. The processing circuit 100 includes a processor 101, a memory 102, and a communication circuit 103. The processor 101 is a central processing unit (CPU; called central processing device, processing device, arithmetic device, microprocessor, microcomputer, and DSP as well), a system large scale integration (LSI), or the like. The memory 102 is a nonvolatile or volatile semiconductor memory such as a random access memory (RAM), a read only memory (ROM), a flash memory, an erasable programmable read only memory (EPROM), or an electrically erasable programmable read-only memory (EEPROM), a magnetic disk, a flexible disk, an optical disk, a compact disc, a minidisc, a digital versatile disc (DVD), or the like.

For example, when a part of the OCM-IF 31, the optical-level-fluctuation detecting unit 32, the control-target-wavelength managing unit 33, the adjustment-implementation determining unit 34, the number-of-wavelengths counting unit 35, the level-adjustment-amount determining unit 36, and the WSS-IF 37 is realized by the processing circuit 100 illustrated in FIG. 2, the processor 101 reads out computer programs respectively corresponding to the components realized by the processing circuit 100 from the memory 102 and executes the computer programs to thereby realize the components. The communication circuit 103 is used when the control device 30 communicates with the work terminal 2, the WSS 10, and the OCM 20.

Figure 3:
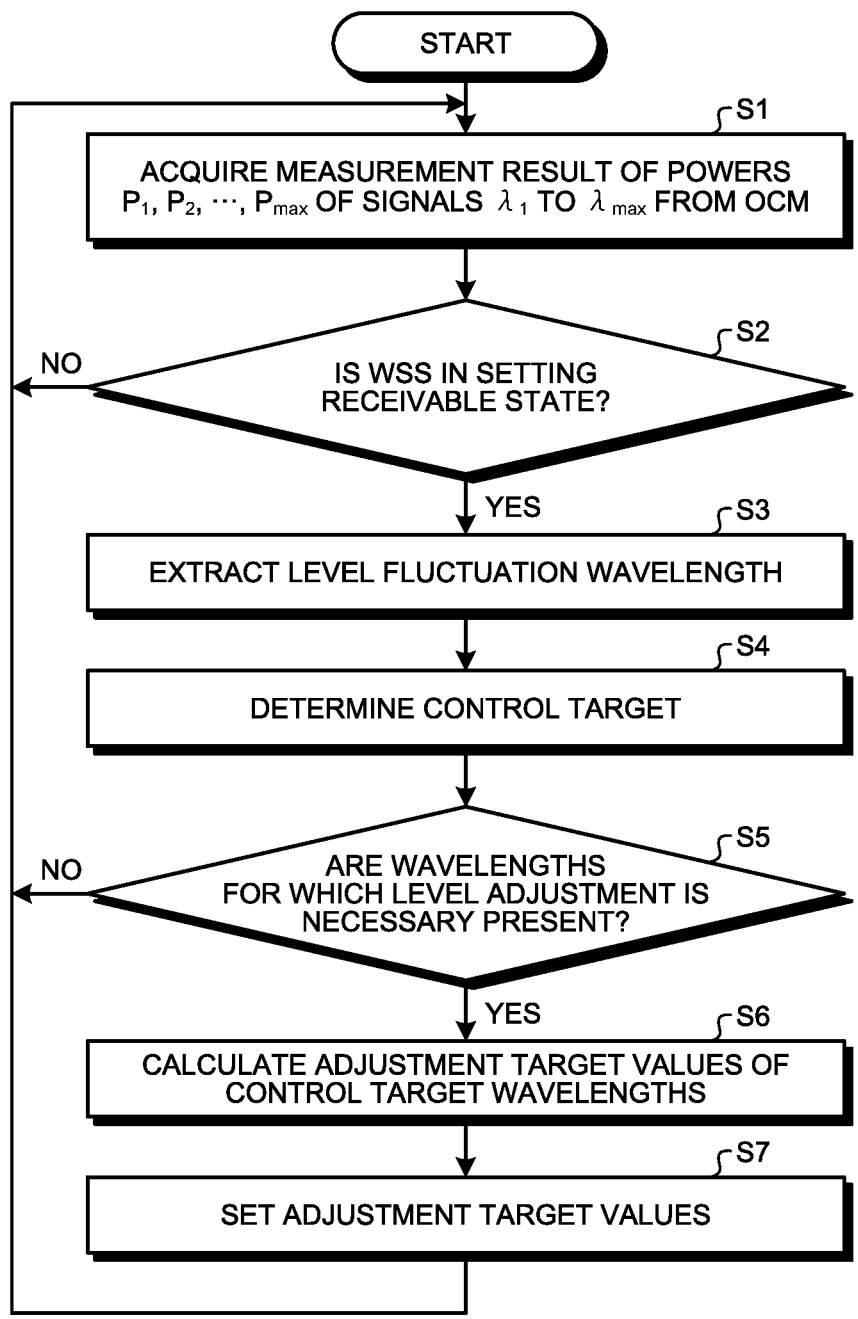
FIG. 3 is a flowchart illustrating an example of dynamic gain control by the control device according to the first embodiment.

Subsequently, operation in which the control device 30 controls the WSS 10 to execute the dynamic gain control, that is, the optical level adjustment for the wavelength is explained with reference to FIG. 3. Note that FIG. 3 is a flowchart illustrating an example of the dynamic gain control by the control device 30 according to the first embodiment. As illustrated in the figure, the dynamic gain control by the control device 30 is always a flow of a loop. The control device 30 repeats processing at steps S1 to S7. In the following explanation, n=1 to a maximum value ($\lambda_{max}$, for example, $\lambda_{max}$=80) of the number of system wavelengths.

First, the control device 30 acquires optical levels, that is, powers $P_1$ to $P_{max}$ of the respective wavelengths $\lambda_1$ to $\lambda_{max}$ from the OCM 20 (step S1). Step S1 is processing executed by the OCM-IF 31 explained above. Subsequently, the control device 30 confirms a state of the WSS 10 and confirms whether the WSS 10 is in a setting receivable state (step S2). A state in which the WSS 10 is not capable of receiving setting corresponds to, for example, a state in which the control device 30 instructs the WSS 10 to perform setting of a relation between wavelengths and ports, wavelengths transmitted through the ports, bands of the wavelengths transmitted through the ports, transmittances of the wavelengths, and the like and the WSS 10 performs a setting change according to the instruction. When receiving the instruction for the setting change from the control device 30, the WSS 10 performs the setting change according to instruction content. When the change is completed, the WSS 10 notifies the change completion to the control device 30. Therefore, the control device 30 can discriminate whether the WSS 10 is in the setting receivable state. Note that the processing at step S2 is not essential and can be omitted. The processing at step S2 can be executed between steps S6 and S7 explained below. When the processing for determining whether the WSS 10 is in the setting receivable state is executed as step S2 illustrated in FIG. 3, it is possible to prevent processing at step S3 and subsequent steps from being unnecessarily executed. It is possible to prevent a processing load from increasing.

When the WSS 10 is not in the setting receivable state (No at step S2), the control device 30 returns to step S1 and continues the processing. When the WSS 10 is in the setting receivable state (Yes at step S2), the control device 30 extracts a level fluctuation wavelength (step S3). That is, the control device 30 discriminates whether the optical levels fluctuate concerning the wavelengths and extracts and outputs information concerning wavelengths, the optical levels of which fluctuate. Specifically, the control device 30 calculates, for each of the wavelengths, differences between the respective optical levels ($P_1$ to $P_{max}$) acquired at step S1 and a specified optical level and compares optical level differences, which are the calculated differences, with a threshold. Note that the threshold is α [dB] explained above. Concerning wavelengths, the optical level differences of which are equal to or larger than the threshold, the control device 30 determines that the optical levels fluctuate. The threshold in use can be the same value for all the wavelengths or can be a different value for each of the wavelengths. Steps S2 and S3 are processing executed by the optical-level-fluctuation detecting unit 32 explained above. At step S2, the optical-level-fluctuation detecting unit 32 acquires necessary information from the WSS-IF 37 and determines whether the WSS 10 is in the setting receivable state. The information acquired from the WSS-IF 37 by the optical-level-fluctuation detecting unit 32 is information indicating whether the WSS 10 is in a state in which the WSS 10 is performing a setting change.

Subsequently, the control device 30 performs determination of control targets of the optical levels (step S4). That is, concerning the wavelengths, the control device 30 determines whether the optical level adjustment is necessary. Specifically, the control device 30 determines, on the basis of the information concerning the wavelengths set as the targets of the optical level adjustment acquired from the work terminal 2 and the information concerning the wavelengths, the optical levels of which are determined as fluctuating at step S3, for each of the wavelengths, whether the optical level adjustment is necessary. The control device 30 determines, as wavelengths for which the optical level adjustment is necessary, the wavelengths, the information concerning the wavelengths set as the targets of the optical level adjustment of which indicates that adjustment of the optical levels is enabled and the optical levels of which are determined as fluctuating at step S3, and sets the wavelengths as control targets of the optical levels. Step S4 is processing executed by the adjustment-implementation determining unit 34.

Subsequently, the control device 30 confirms presence or absence of wavelengths for which the level adjustment is necessary (step S5). That is, the control device 30 confirms whether one or more wavelengths for which the optical level adjustment is determined as necessary at step S4 are present. Step S5 is processing executed by the number-of-wavelengths counting unit 35. When there is no wavelength for which the optical level adjustment is determined as necessary at step S4 (No at step S5), the control device 30 returns to step S1 and continues the processing.

When one or more wavelengths for which the optical level adjustment is determined as necessary at step S4 are present (Yes at step S5), the control device 30 calculates adjustment target values of the control target wavelengths, that is, the wavelengths for which the optical level adjustment is necessary (step S6). The adjustment target value is "the adjustment amount of the optical level" explained above. The control device 30 calculates, for each of the wavelengths, a difference between each of optical levels ($P_n$) of the wavelengths for which the optical level adjustment is determined as necessary at step S4 among the optical levels ($P_1$ to $P_{max}$) acquired at step S1 and a specified optical level and sets the calculated difference as the adjustment target value. Step S6 is processing executed by the level-adjustment-amount determining unit 36 explained above.

Subsequently, the control device 30 sets, in the WSS 10, the adjustment target values of the wavelengths for which the optical level adjustment is necessary calculated at step S6 (step S7). That is, the control device 30 instructs the WSS 10 to perform a setting change such that the WSS 10 adjusts the optical levels according to the adjustment target values calculated at step S6. Step S7 is processing executed by the WSS-IF 37 explained above. The WSS-IF 37 instructs the setting change by notifying transmittances of the wavelengths to the WSS 10. At this time, the WSS-IF 37 notifies only transmittances of the wavelengths for which the optical level adjustment is necessary to the WSS 10. Note that, when receiving the instruction for the setting change, that is, the notification of the transmittances of the wavelengths for which the optical level adjustment is necessary from the control device 30, the WSS 10 starts a setting change operation. For a few seconds required until the setting change of the transmittances of the wavelengths for which the optical level adjustment is necessary is completed after the setting change operation is started, the WSS 10 is in a state in which the WSS 10 cannot receive the next setting change instruction.

An effect obtained by the optical relay device 1 according to the first embodiment is explained. As an example, a state is assumed in which the wavelengths $\lambda 1$, $\lambda 2$, $\lambda 3$, and $\lambda 4$ in service are input from the Port #In1 and a new additional wavelength $\lambda 5$ is input from the Port #In2. It is assumed that the new additional wavelength $\lambda 5$ is being started as new signal light. That is, it is assumed that, because the wavelength $\lambda 5$ is the new signal light, an adjustment time is required before an output of the specified optical level is sent off and an optical level is being adjusted in a light source. An optical output change before the optical level reaches the specified optical level is different for each individual because of individual variation of the light source. In this case, the optical level of the wavelength $\lambda 5$ is in an unstable state. If the optical level adjustment for the wavelength $\lambda 5$ is enabled in the optical relay device 1, before the wavelength $\lambda 5$ is sent off from the light source at the specified optical level, the optical relay device 1 repeatedly executes the optical level adjustment for the wavelength $\lambda 5$, that is, the setting change of the WSS 10. As explained above, the next setting change cannot be carried out while the WSS 10 is carrying out the setting change. Therefore, when optical level fluctuation occurs in wavelengths (a part or all of the wavelengths $\lambda 1$ to $\lambda 4$) in service in a state in which the WSS 10 is carrying out the setting change for the optical level adjustment for the wavelength $\lambda 5$, a waiting time before a start of the optical level adjustment for the wavelengths in service occurs. That is, a state in which signal transmission quality is deteriorated lasts long. However, it is possible to reduce the required time of the optical level adjustment by performing, from the work terminal 2 to the control-target-wavelength managing unit 33, setting for setting the wavelengths $\lambda 1$, $\lambda 2$, $\lambda 3$, and $\lambda 4$ already in operation to "optical level adjustment enabled" and setting the wavelength $\lambda 5$, which is the new signal light, to "optical level adjustment disabled".

That is, because the optical level adjustment for the wavelength $\lambda 5$ is set to disabled, even if fluctuation in the optical level occurs in the wavelength $\lambda 5$, if fluctuation in the optical levels does not occur in the wavelengths $\lambda 1$ to $\lambda 4$, the control device 30 does not carry out the optical level adjustment. Therefore, it is possible to prevent a WSS setting disabled period, which is a period in which a setting change cannot be instructed to the WSS 10, from occurring more than necessary. Because the control device 30 disables the optical level adjustment for the wavelength $\lambda 5$ and stays on standby, the control device 30 does not carry out the optical level adjustment even if only the optical level of the wavelength $\lambda 5$ fluctuates. When the optical levels of a part or all of the wavelengths $\lambda 1$, $\lambda 2$, $\lambda 3$, and $\lambda 4$ fluctuate immediately thereafter, it is possible to start the optical level adjustment for the wavelengths, the optical level fluctuation of which is detected, without a waiting time.

In this way, with the optical relay device 1 according to this embodiment, it is possible to reduce, by a time of a dynamic gain control execution cycle at most, a required time from optical level fluctuation detection until optical level adjustment start in the case of detection of optical level fluctuation. The dynamic gain control execution cycle is a required time from a time when the control device 30 instructs the WSS 10 to perform a setting change of transmittance of a specific wavelength until the WSS 10 completes the setting change.

Note that the required time from the detection of the optical level fluctuation until the start of the optical level adjustment can be reduced by the time of the dynamic gain control execution cycle when only the optical levels of the wavelengths, the optical level adjustment for which is disabled, fluctuate and the optical level fluctuation of the wavelengths, the optical level adjustment for which is enabled, occurs immediately thereafter. The optical level adjustment is not performed for the wavelengths, the optical level adjustment for which is disabled, irrespective of presence or absence of the optical level fluctuation. Therefore, it is possible to prevent the number of wavelengths for which the optical level adjustment is carried out from being increasing more than necessary. When the optical level fluctuation of the wavelengths, the optical level adjustment for which is enabled, and the optical level fluctuation of the wavelengths, the optical level adjustment for which is disabled, simultaneously occur, the optical level adjustment is performed targeting only the wavelengths, the optical level adjustment for which is enabled. Therefore, it is possible to reduce a time required for the optical level adjustment, that is, the setting change of the WSS 10 to be performed once.

As explained above, the optical relay device 1 according to this embodiment retains the setting information concerning whether each of the wavelengths is set as a target of the optical level adjustment. When fluctuation in an optical level is detected, if a wavelength in which the fluctuation in the optical level is detected is set as a target of the optical level adjustment, the optical relay device 1 executes the optical level adjustment on the wavelength. If the in which the fluctuation in the optical level is detected is not set as a target of the optical level adjustment, the optical relay device 1 does not execute the optical level adjustment on the wavelength. Consequently, it is possible to prevent a situation in which unnecessary optical level adjustment, that is, setting of a WSS is executed and start timing of the subsequent optical level adjustment is delayed. Therefore, with the optical relay device 1 according to this embodiment, it is possible to reduce a required time from the detection of the fluctuation in the optical level until completion of the optical level adjustment and improve signal transmission quality in the optical transmission system.

Note that not all of optical relay devices configuring the optical transmission system need to be set as the optical relay device 1 according to the first embodiment. It is possible to improve the signal transmission quality in the optical transmission system by setting a part of the optical relay devices as the optical relay device 1. By adopting the optical transmission system including at least one optical relay device 1, a time required for the optical level adjustment in the case of detection of optical level fluctuation in the optical relay device 1 decreases compared with a configuration not including the optical relay device 1. Therefore, the signal transmission quality in the optical transmission system is improved.

Second Embodiment

Figure 4:
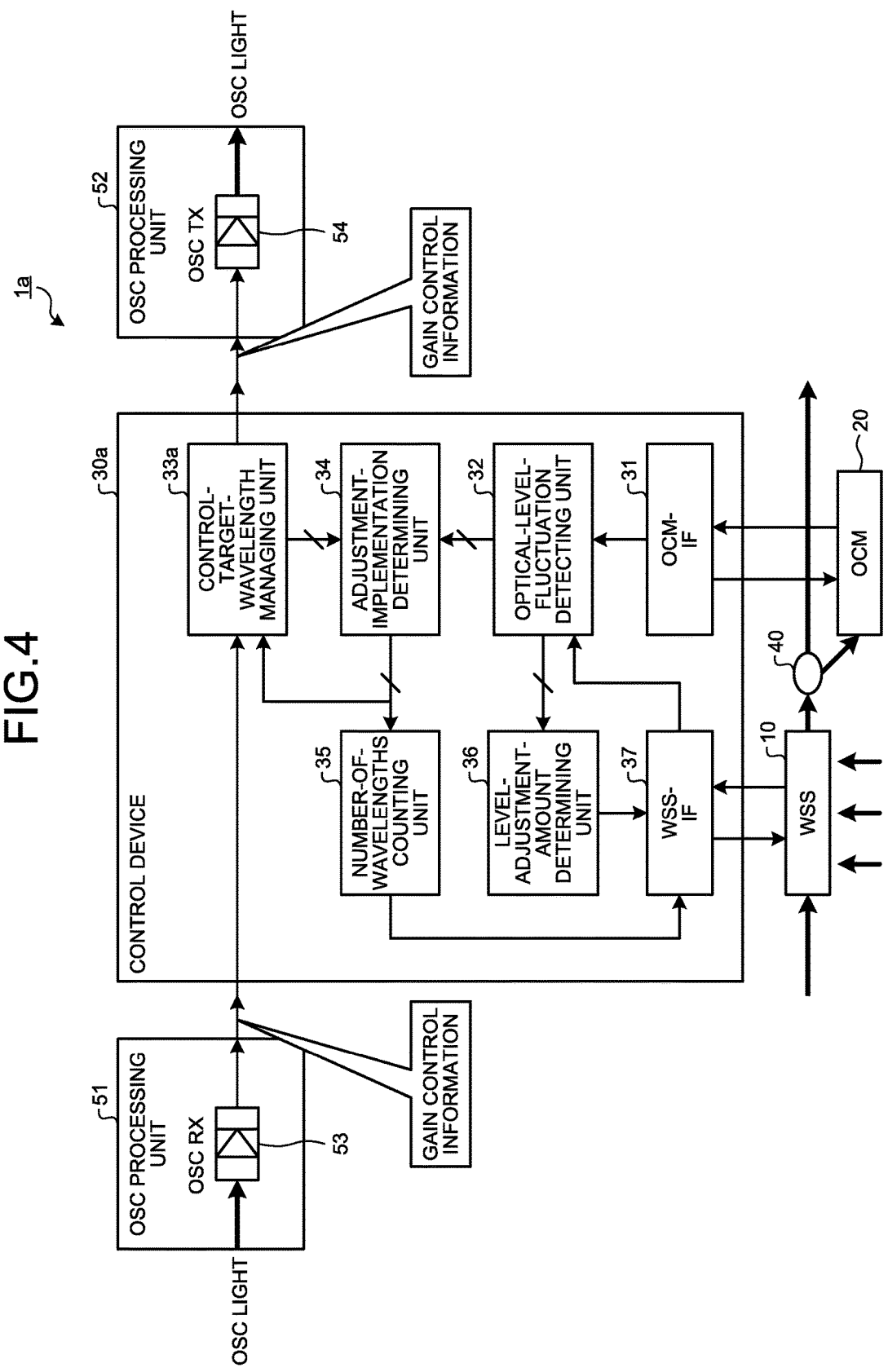
FIG. 4 is a diagram illustrating a configuration example of an optical relay device according to a second embodiment.

FIG. 4 is a diagram illustrating a configuration example of an optical relay device according to the second embodiment.

An optical relay device 1a according to the second embodiment includes a configuration in which the control device 30 of the optical relay device 1 according to the first embodiment is replaced with a control device 30a and optical supervisory channel (OSC) processing units 51 and 52 are added. Note that, in the optical relay device 1a, components denoted by the same reference numerals and signs as the reference numerals and signs in the optical relay device 1 are the same as the corresponding components of the optical relay device 1. Therefore, explanation of the components is omitted.

In the control device 30a, the control-target-wavelength managing unit 33 of the control device 30 according to the first embodiment is replaced with a control-target-wavelength managing unit 33a. The control device 30a is the same as the control device 30 in the first embodiment except that the control device 30a includes the control-target-wavelength managing unit 33a. Therefore, explanation of the components other than the control-target-wavelength managing unit 33a is omitted.

As explained in the first embodiment, the control-target-wavelength managing unit 33 of the control device 30 acquires, from the work terminal 2, the setting information indicating whether the dynamic gain control of the wavelengths is enabled or disabled and retains the setting information. On the other hand, the control-target-wavelength managing unit 33a of the control device 30a according to this embodiment acquires information concerning setting of the dynamic gain control from another optical relay device, which is a relay source of an optical signal, and, on the basis of the acquired information, sets the dynamic gain control for each of wavelengths, that is, sets wavelengths for which the optical level adjustment is enabled and wavelengths for which the optical level adjustment is disabled. The control-target-wavelength managing unit 33a generates information concerning wavelengths for which the dynamic gain control, that is, the optical level adjustment is carried out and transmits the generated information to another relay device at a relay destination of the optical signal as gain control information.

The OSC processing unit 51 includes an OSC receiving unit (OSC RX) 53 that receives OSC light transmitted from another optical relay device. The OSC light is signal light used when monitoring and control of devices configuring a wavelength-multiplexing transmission system are performed in the wavelength-multiplexing transmission system. The OSC light received by the OSC receiving unit 53 includes gain control information in the other optical relay device, that is, information concerning a wavelength for which the optical level adjustment is carried out in the other relay device.

The OSC processing unit 52 includes an OSC transmitting unit (OSC TX) 54 that transmits OSC light to another optical relay device. The OSC light transmitted by the OSC transmitting unit 54 includes gain control information, which is information concerning a wavelength for which the optical level adjustment is carried out in the own device (the own optical relay device).

Figure 5:
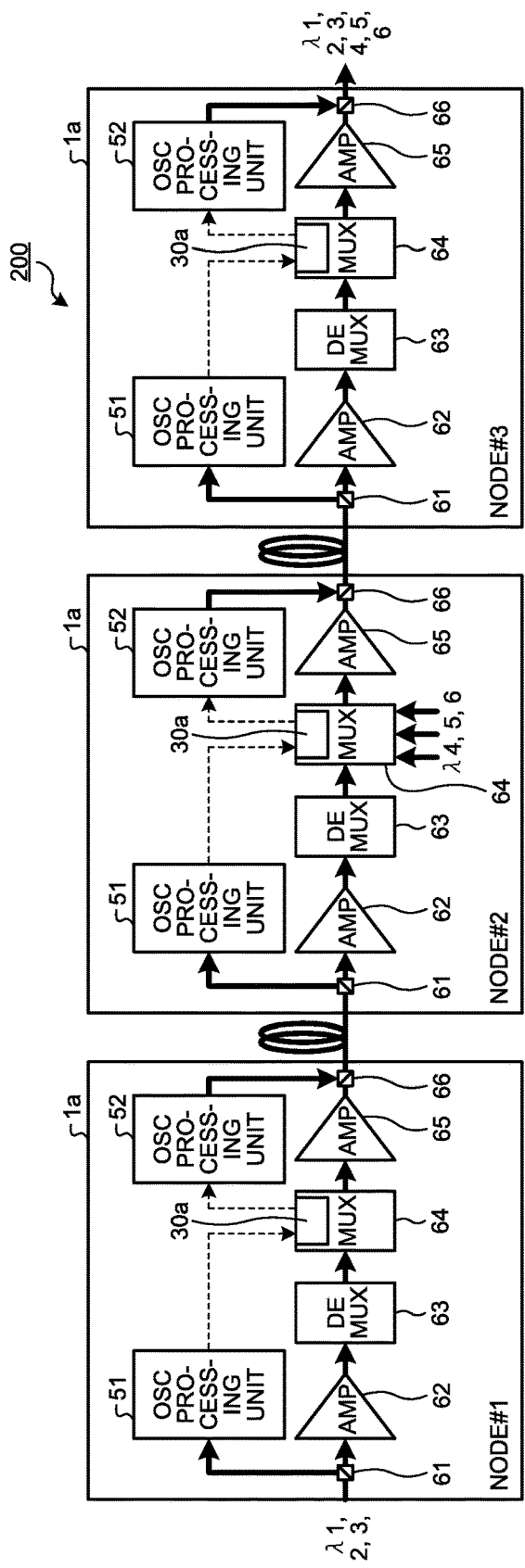
FIG. 5 is a diagram illustrating a configuration example of an optical transmission system formed by connecting a plurality of optical relay devices according to the second embodiment.

First, connection of a plurality of optical relay devices 1a is explained with reference to FIG. 5. FIG. 5 is a diagram illustrating a configuration example of an optical transmission system 200, which is a wavelength-multiplexing optical transmission system formed by connecting a plurality of optical relay devices 1a according to the second embodiment. For convenience, three optical relay devices 1a illustrated in FIG. 5 are referred to as node #1, node #2, and node #3 and explained.

Figure 6:
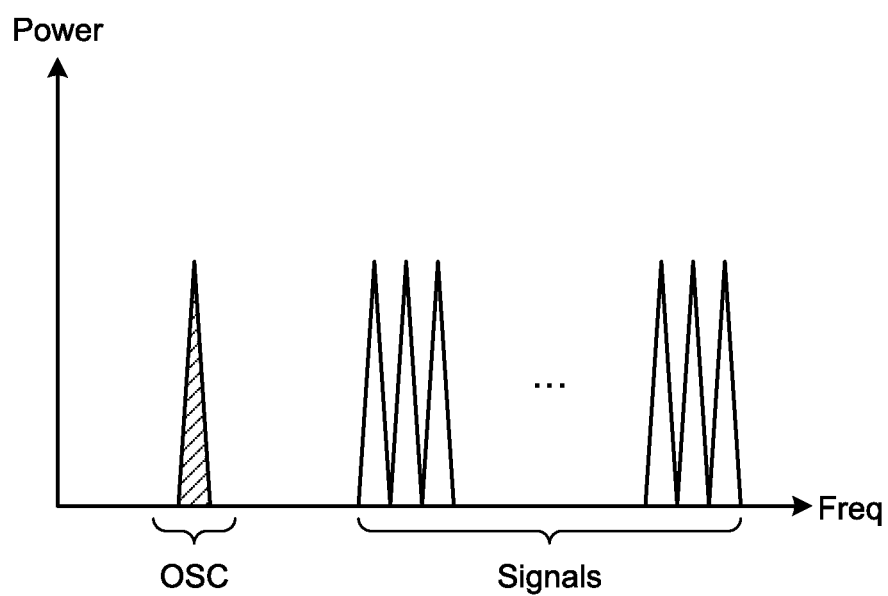
FIG. 6 is a diagram illustrating an example of a relation between OSC light and service wavelengths.

The nodes #1 to #3 are connected by an optical fiber. OSC light is transmitted by the same fiber as the fiber for service wavelengths λ1 to λ6 used for transmission of user data. As the wavelength of the OSC light, as illustrated in FIG. 6, a wavelength band different from the service wavelengths is used. Note that, in an example illustrated in FIG. 6, a band illustrated as "OSC" is a band of the OSC light and bands illustrated as "Signals" are bands of the service wavelengths.

The nodes #1 to #3 includes demultiplexers 61, amplifiers (AMPS) 62, demultiplexing devices (DF MUXs) 63, multiplexing devices (MUXs) 64, amplifiers (AMPS) 65, and multiplexers 66 not illustrated in FIG. 4.

The demultiplexer 61 demultiplexes an optical signal obtained by wavelength-multiplexing service wavelengths and OSC light, separates the optical signal into the service wavelengths and the OSC light, and inputs the service wavelengths to the amplifier 62 and inputs the OSC light to the OSC processing unit 51.

The amplifier 62 collectively amplifies the input service wavelengths. The demultiplexing device 63 includes a not-illustrated plurality of output ports. The demultiplexing device 63 demultiplexes the input service wavelengths into service wavelengths output to the same ports at output destinations and outputs the service wavelengths from the output ports.

The multiplexing device 64 is configured by the WSS 10, the OCM 20, and the control device 30a illustrated in FIG. 4. The multiplexing device 64 multiplexes wavelengths input from a respective plurality of input ports and outputs the wavelengths. Note that, in FIG. 5, the WSS 10 and the OCM 20 are not illustrated. As explained in the first embodiment, the WSS 10 of the multiplexing device 64 is capable of individually attenuating and adjusting optical levels of wavelengths to be output.

The amplifier 65 collectively amplifies the input service wavelengths. The multiplexer 66 multiplexes and outputs the service wavelengths output from the amplifier 65 and the OSC light output from the OSC processing unit 52.

Note that, although explanation is omitted in the first embodiment, the optical relay device 1 according to the first embodiment also includes the demultiplexer 61, the amplifier 62, the demultiplexing device 63, the multiplexing device 64, the amplifier 65, and the multiplexer 66.

The operation of the optical relay device 1a according to this embodiment is explained. Note that differences from the optical relay device 1 according to the first embodiment are explained.

In the optical relay device 1a, the control-target-wavelength managing unit 33a of the control device 30a acquires, from the adjustment-implementation determining unit 34, information concerning a determination result in the adjustment-implementation determining unit 34, that is, a determination result indicating whether the optical level adjustment concerning each of the wavelengths set as the targets of the optical level adjustment is necessary and outputs the acquired information to the OSC processing unit 52 as gain control information. Note that, for the purpose of reducing an information amount to be transmitted, the control-target-wavelength managing unit 33a can output, as the gain control information, only information concerning wavelengths for which the optical level adjustment is carried out or only information concerning wavelengths for which the optical level adjustment is not carried out. When gain control information is transmitted from another optical relay device 1a via the OSC processing unit 51, the control-target-wavelength managing unit 33a sets, on the basis of the transmitted gain control information, wavelengths for which the optical level adjustment is enabled and wavelengths for which the optical level adjustment is disabled. Specifically, the control-target-wavelength managing unit 33a confirms the gain control information, sets wavelengths, for which the optical level adjustment is carried out in the other optical relay device 1a, to optical level adjustment disabled and sets wavelengths, for which the optical level adjustment is not carried out in the other optical relay device 1a, to optical level adjustment enabled. That is, the control-target-wavelength managing unit 33a sets wavelengths, for which the optical level adjustment is determined as unnecessary in the optical relay device 1a at a transmission source of the gain control information, to optical level adjustment enabled and sets wavelengths, for which the optical level adjustment is determined as necessary in the optical relay device 1a at the transmission source of the gain control information, to optical level adjustment disabled.

The OSC transmitting unit 54 of the OSC processing unit 52 converts gain control information output as digital data from the control-target-wavelength managing unit 33a into OSC light and outputs the OSC light. Note that the OSC transmitting unit 54 can converts, other than the gain control information, other information into the OSC light together with the gain control information.

When receiving OSC light transmitted from another optical relay device, the OSC receiving unit 53 of the OSC processing unit 51 converts the OSC light into digital data, extracts gain control information from the digital data, and outputs the gain control information to the control-target-wavelength managing unit 33a.

An effect obtained by the optical relay device 1a according to the second embodiment is explained. It is assumed that the optical relay device 1a configures the optical transmission system 200 illustrated in FIG. 5. That is, the optical relay device 1a is in a state in which signal lights in operation, specifically, the wavelengths $\lambda 1$, $\lambda 2$, and $\lambda 3$ are input to the node #1 and, in the node #2, other signal lights in operation, specifically, the wavelengths $\lambda 4$, $\lambda 5$, and $\lambda 6$ are inserted into the wavelengths $\lambda 1$, $\lambda 2$, and $\lambda 3$. The optical relay device 1a is in a state in which an output port of the node #1 and an input port of the node #2 are connected and an output port of the node #2 and an input port of the node #3 are connected.

In the optical transmission system 200 illustrated in FIG. 5, when optical level fluctuation of the wavelengths $\lambda 4$, $\lambda 5$, and $\lambda 6$ occurs anew while optical level fluctuation of the wavelengths $\lambda 1$, $\lambda 2$, and $\lambda 3$ occurs, the optical relay device 1a adjusts optical levels of the wavelengths in a procedure explained below.

When optical levels of the wavelengths $\lambda 1$, $\lambda 2$, and $\lambda 3$ fluctuate at a point in time of an input to the node #1, the optical level fluctuation is detected in the node #1, the node #2, and the node #3. Because the optical level fluctuation detection of the node #1, the node #2, and the node #3 is asynchronous, a plurality of patterns of nodes that detect the optical level fluctuation are conceivable. In the following explanation, the following cases are explained: (1) the node #1 detects the optical level fluctuation of the wavelengths $\lambda 1$, $\lambda 2$, and $\lambda 3$ first, (2) the node #2 detects the optical level fluctuation of the wavelengths $\lambda 1$, $\lambda 2$, and $\lambda 3$ first, and (3) the node #3 detects the optical level fluctuation of the wavelengths $\lambda 1$, $\lambda 2$, and $\lambda 3$ first.

(1) The Case in which the Node #1 Detects the Optical Level Fluctuation of the Wavelengths $\lambda 1$, $\lambda 2$, and $\lambda 3$ First In this case, in the node #1, the optical-level-fluctuation detecting unit 32, the control-target-wavelength managing unit 33a, and the adjustment-implementation determining unit 34 execute the operation explained above to thereby determine the wavelengths $\lambda 1$, $\lambda 2$, and $\lambda 3$ as wavelengths for which the optical level adjustment is necessary. According to this result, the node #1 operates the number-of-wavelengths counting unit 35 and the WSS-IF 37 and adjusts optical levels of the wavelengths $\lambda 1$, $\lambda 2$, and $\lambda 3$ using the WSS 10. Further, using the control-target-wavelength managing unit 33a and the OSC processing unit 52, the node #1 transmits OSC light to the node #2 and notifies that the optical level adjustment for the wavelengths $\lambda 1$, $\lambda 2$, and $\lambda 3$ is carried out. In the node #2, the OSC processing unit 51 receives the OSC light transmitted from the node #1, extracts gain control information, and outputs the gain control information to the control device 30a. In the control device 30a of the node #2, the control-target-wavelength managing unit 33a receives the gain control information and recognizes that the optical level adjustment for the wavelengths $\lambda 1$, $\lambda 2$, and $\lambda 3$ is carried out. The control-target-wavelength managing unit 33a sets the optical level adjustment for the wavelengths $\lambda 1$, $\lambda 2$, and $\lambda 3$ to disabled. In the node #2, optical level fluctuation of the wavelengths $\lambda 1$, $\lambda 2$, and $\lambda 3$ is excluded from a target of the optical level adjustment. Therefore, when optical level fluctuation of the wavelengths $\lambda 1$, $\lambda 2$, and $\lambda 3$ occurs and optical level fluctuation of the wavelengths $\lambda 4$, $\lambda 5$, and $\lambda 6$ also occurs, the optical level adjustment for the wavelengths $\lambda 1$, $\lambda 2$, and $\lambda 3$ is not carried out and only the optical level adjustment for the wavelengths $\lambda 4$, $\lambda 5$, and $\lambda 6$ is carried out. Therefore, the node #2 can start the optical level adjustment for the wavelengths $\lambda 4$, $\lambda 5$, and $\lambda 6$ without a waiting time. As a result, the node #2 can reduce a required time from optical level fluctuation detection until optical level adjustment start of the wavelengths $\lambda 4$, $\lambda 5$, and $\lambda 6$ by a time of the dynamic gain control execution cycle at most.

(2) The Case in which the Node #2 Detects the Optical Level Fluctuation of the Wavelengths $\lambda 1$, $\lambda 2$, and $\lambda 3$ First In this case, in the node #2, the optical-level-fluctuation detecting unit 32, the control-target-wavelength managing unit 33a, and the adjustment-implementation determining unit 34 execute the operation explained above to thereby determine the wavelengths $\lambda 1$, $\lambda 2$, and $\lambda 3$ as wavelengths for which the optical level adjustment is necessary. According to this result, the node #2 operates the number-of-wavelengths counting unit 35 and the WSS-IF 37 and adjusts optical levels of the wavelengths $\lambda 1$, $\lambda 2$, and $\lambda 3$ using the WSS 10. Further, using the control-target-wavelength managing unit 33a and the OSC processing unit 52, the node #2 transmits OSC light to the node #3 and notifies that the optical level adjustment for the wavelengths $\lambda 1$, $\lambda 2$, and $\lambda 3$ is carried out. In the node #3, the OSC processing unit 51 receives the OSC light transmitted from the node #2, extracts gain control information, and outputs the gain control information to the control device 30a. In the control device 30a of the node #3, the control-target-wavelength managing unit 33a receives the gain control information and recognizes that the optical level adjustment for the wavelengths $\lambda 1$, $\lambda 2$, and $\lambda 3$ is carried out. The control-target-wavelength managing unit 33a sets the optical level adjustment for the wavelengths $\lambda 1$, $\lambda 2$, and $\lambda 3$ to disabled. In the node #3, optical level fluctuation of the wavelengths $\lambda 1$, $\lambda 2$, and $\lambda 3$ is excluded from a target of the optical level adjustment. Therefore, when optical level fluctuation of the wavelengths $\lambda 1$, $\lambda 2$, and $\lambda 3$ occurs and optical level fluctuation of the wavelengths $\lambda 4$, $\lambda 5$, and $\lambda 6$ also occurs, the optical level adjustment for the wavelengths $\lambda 1$, $\lambda 2$, and $\lambda 3$ is not carried out and only the optical level adjustment for the wavelengths $\lambda 4$, $\lambda 5$, and $\lambda 6$ is carried out. Therefore, the node #3 can start the optical level adjustment for the wavelengths λ4, λ5, and λ6 without a waiting time. As a result, the node #3 can reduce a required time from optical level fluctuation detection until optical level adjustment start of the wavelengths λ4, λ5, and λ6 by a time of the dynamic gain control execution cycle at most. Note that, in the node #1, information indicating that the node #2 is carrying out the optical level adjustment for the wavelengths λ1, λ2, and λ3 is not notified from the node #2. Therefore, when detecting optical level fluctuation of the wavelengths λ1, λ2, and λ3, it is also possible to carry out the optical level adjustment for the wavelengths.

(3) In the Case in which the Node #3 Detects the Optical Level Fluctuation of the Wavelengths λ1, λ2, and λ3 First In this case, in the node #3, the optical-level-fluctuation detecting unit 32, the control-target-wavelength managing unit 33a, and the adjustment-implementation determining unit 34 execute the operation explained above to thereby determine the wavelengths λ1, λ2, and λ3 as wavelengths for which the optical level adjustment is necessary. According to this result, the node #3 operates the number-of-wavelengths counting unit 35 and the WSS-IF 37 and adjusts optical levels of the wavelengths λ1, λ2, and λ3 using the WSS 10. Further, using the control-target-wavelength managing unit 33a and the OSC processing unit 52, the node #3 transmits OSC light to a downstream node, that is, a node at a transmission source of the wavelengths and notifies that the optical level adjustment for the wavelengths λ1, λ2, and λ3 is carried out. It is not notified to the nodes #1 and #2 that the node #3 is carrying out the optical level adjustment for the wavelengths λ1, λ2, and λ3. Therefore, it is likely that the optical level adjustment for the wavelengths λ1, λ2, and λ3 is carried out anew in one or both of the nodes #1 and #2. When optical level fluctuation of the wavelengths λ4, λ5, and λ6 occurs anew during optical level fluctuation of the wavelengths λ1, λ2, and λ3, the node #2, the node #3, or a node that detects the optical level fluctuation of the wavelengths λ4, λ5, and λ6 earliest among nodes downstream of the node #3, specifically, nodes that are not executing the setting change operation of the WSS 10 carries out the optical level adjustment for the wavelengths λ4, λ5, and λ6. As a result, it is possible to reduce a required time from optical level fluctuation detection until optical level adjustment start of the respective wavelengths λ1 to λ3 and λ4 to λ6 by a time of the dynamic gain control execution cycle at most.

Note that, the control-target-wavelength managing unit 33a can be configured to be capable of executing, in addition to the operation explained above, the same operation as the operation of the control-target-wavelength managing unit 33 in the first embodiment, specifically, operation for connecting the work terminal 2 and acquiring information concerning wavelengths for which optical level adjustment is unnecessary from the work terminal 2. When acquiring the information concerning the wavelengths for which the optical level adjustment is unnecessary from the work terminal 2, the control-target-wavelength managing unit 33a always sets the wavelengths indicated by the information acquired from the work terminal 2 as wavelengths for which the optical level adjustment is unnecessary irrespective of content of gain control information received from another optical relay device 1a at a transmission source of an optical signal.

As explained above, the optical relay device 1a according to this embodiment acquires information concerning wavelengths for which the optical level adjustment is carried out in another optical relay device and sets, on the basis of the acquired information, whether each of the wavelengths is set as a target of the optical level adjustment. When detecting optical level fluctuation and carrying out the optical level adjustment, the optical relay device 1a transmits information concerning the wavelengths for which the optical level adjustment is carried out to another optical relay device 1a on the downstream side. Like the optical relay device 1 according to the first embodiment, when detecting fluctuation in an optical level, if a wavelength in which the fluctuation in the optical level is detected is set as a target of the optical level adjustment, the optical relay device 1a executes the optical level adjustment for the wavelength. If the wavelength in which the fluctuation in the optical level is detected is not set as a target of the optical level adjustment, the optical relay device 1a does not execute the optical level adjustment for the wavelength. Consequently, it is possible to prevent a situation in which unnecessary optical level adjustment, that is, setting of a WSS is executed and start timing of the subsequent optical level adjustment is delayed. Therefore, it is possible to reduce a required time from the detection of the fluctuation in the optical level until completion of the optical level adjustment and improve signal transmission quality.

Note that not all of optical relay devices configuring the optical transmission system 200 need to be set as the optical relay device 1a according to the second embodiment. It is possible to improve the signal transmission quality in the optical transmission system 200 by setting a part of the optical relay devices as the optical relay device 1a. The optical transmission system 200 only has to include directly-connected two or more optical relay devices 1a, of which the optical relay device 1a on the upstream side, that is, a transmission side of an optical signal transmits gain control information to the optical relay device 1a on the downstream side.

Third Embodiment

Figure 7:
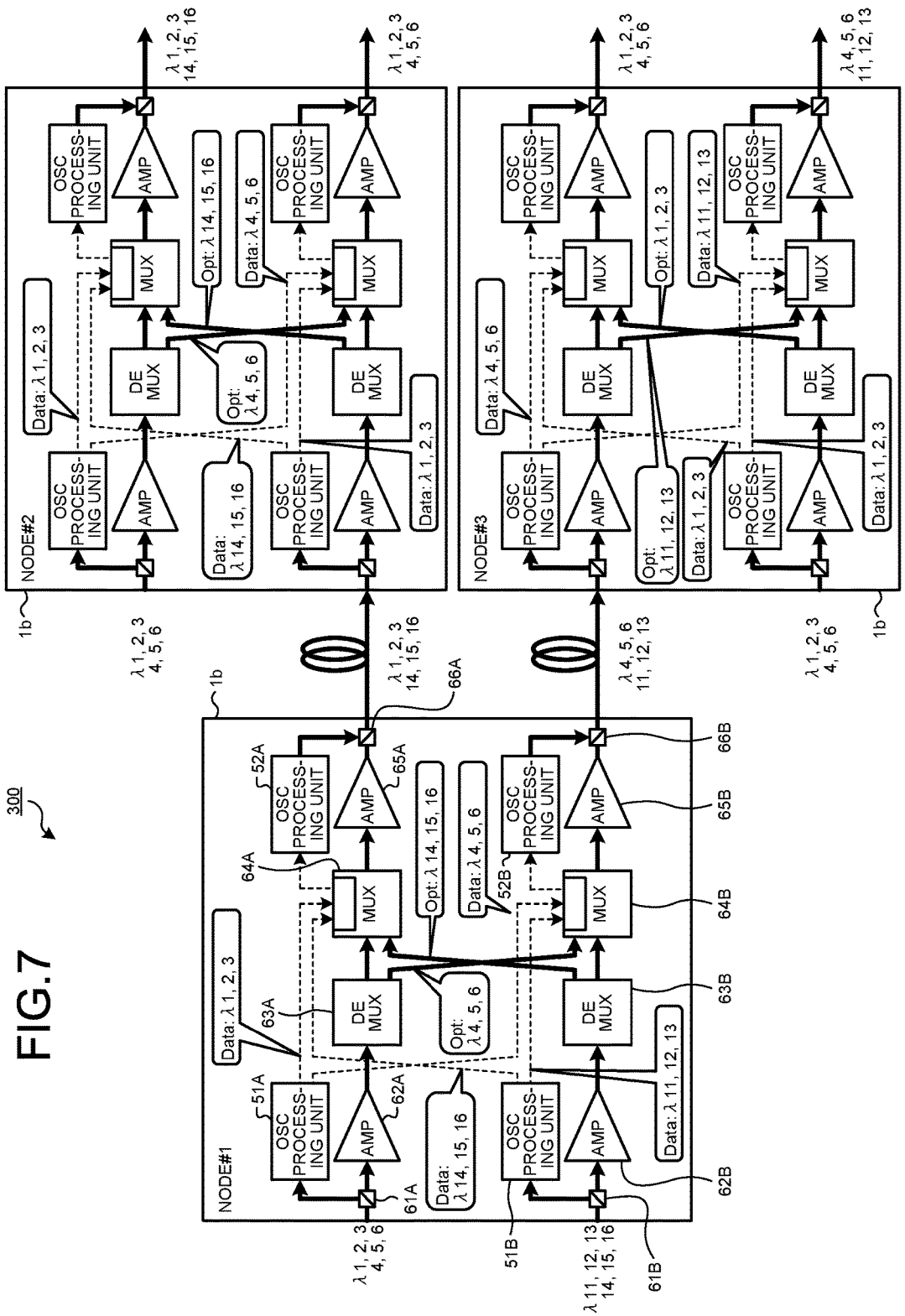
FIG. 7 is a diagram illustrating a configuration example of an optical transmission system formed by connecting a plurality of optical relay devices according to a third embodiment.

FIG. 7 is a diagram illustrating a configuration example of an optical transmission system 300, which is a wavelength-multiplexing optical transmission system formed by connecting a plurality of optical relay devices 1b according to a third embodiment. In the optical transmission system 300 illustrated in FIG. 7, the configuration of the optical transmission system 200 according to the second embodiment is expanded to multiple ways.

In the optical relay device 1b according to the third embodiment, the number of input interfaces and the number of output interfaces of the optical relay device 1a explained in the second embodiment are expanded by the number of paths.

The optical transmission system 300 illustrated in FIG. 7 includes a configuration in which the optical relay device 1b of the node #2 and the optical relay device 1b of the node #3 are connected to the output ports of the optical relay device 1b of the node #1. The wavelengths λ1 to λ6 are input to a first input port of the node #1. Wavelengths λ11 to λ16 are input to a second input port of the node #1. The node #2 is connected to a first output port of the node #1. The wavelengths λ1 to λ3 and λ14 to λ16 are output from the node #1 to the node #2. The node #3 is connected to a second output port of the node #1. The wavelengths λ4 to λ6 and λ11 to λ13 are output from the node #1 to the node #3.

The optical relay device 1b includes OSC processing units 51A and 51B, OSC processing units 52A and 52B, demultiplexers 61A and 61B, amplifiers 62A and 62B, demultiplexing devices 63A and 63B, multiplexing devices 64A and 64B, amplifiers 65A and 65B, and multiplexers 66A and 66B.

The OSC processing units 51A and 51B, the OSC processing units 52A and 52B, the demultiplexers 61A and 61B, the amplifiers 62A and 62B, the demultiplexing devices 63A and 63B, the multiplexing devices 64A and 64B, the amplifiers 65A and 65B, and the multiplexers 66A and 66B of the optical relay device 1b respectively carry out the same kinds of processing as the kinds of processing of the OSC processing unit 51, the OSC processing unit 52, the demultiplexer 61, the amplifier 62, the demultiplexing device 63, the multiplexing device 64, the amplifier 65, and the multiplexer 66 configuring the optical relay device 1a in the second embodiment.

However, the OSC processing units 51A and 51B are configured to output gain control information extracted from OSC light to both of the multiplexing devices 64A and 64B. Wavelengths after demultiplexing output from the demultiplexing devices 63A and 63B can be input to both of the multiplexing devices 64A and 64B.

The control-target-wavelength managing units 33a not illustrated in the figure of the multiplexing devices 64A and 64B set, on the basis of each of kinds of gain control information input from the OSC processing units 51A and 51B, dynamic gain control for each of wavelengths multiplexed in a path on which the control-target-wavelength managing units 33a are disposed, that is, set wavelengths, optical level adjustment for which is enabled, and wavelengths, optical level adjustment for which is disabled. The control-target-wavelength managing units 33a generate and output gain control information.

By adopting the configuration illustrated in FIG. 7, even in the case of the multiple ways, it is possible to reduce, by a time of a dynamic gain control execution cycle at most, a required time from a time when the optical relay device 1b detects optical level fluctuation until the optical relay device 1b starts optical level adjustment.

Note that not all of optical relay devices configuring the optical transmission system 300 need to be set as the optical relay device 1b according to the third embodiment. It is possible to improve the signal transmission quality in the optical transmission system 300 by setting a part of the optical relay devices as the optical relay device 1b. The optical transmission system 300 only has to include directly-connected two or more optical relay devices 1b, of which the optical relay device 1b on the upstream side transmits gain control information to the optical relay device 1b on the downstream side.

In FIG. 7, an example of the optical transmission system configured by only the optical relay devices 1b is illustrated. However, it is also possible to mix the optical relay device 1a in the second embodiment and the optical relay device 1b to configure an optical transmission system.

The configurations explained in the embodiments explained above indicate examples of the contents of the present invention. The configurations can be combined with other publicly-known technologies. A part of the configurations can be omitted or changed in a range not departing from the spirit of the present invention.

REFERENCE SIGNS LIST 1, 1a, 1b optical relay device
10 WSS
20 OCM
30, 30a control device
31 OCM-IF
32 optical-level-fluctuation detecting unit
33, 33a control-target-wavelength managing unit
34 adjustment-implementation determining unit
35 number-of-wavelengths counting unit
36 level-adjustment-amount determining unit
37 WSS-IF
40 optical splitter
51, 51A, 51B, 52, 52A, 52B OSC processing unit
53 OSC receiving unit
54 OSC transmitting unit
61, 61A, 61B demultiplexer
62, 62A, 62B, 65, 65A, 65B amplifier
63, 63A, 63B demultiplexing device
64, 64A, 64B multiplexing device
66, 66A, 66B multiplexer
200, 300 optical transmission system

The invention claimed is:

1. An optical relay device comprising:
a wavelength selective switcher capable of performing path switching in wavelength units and optical level adjustment for each of wavelengths and incapable of receiving new setting during a setting change of a wavelength and a band transmitted through ports, and transmittance; and
a controller to instruct, on the basis of a fluctuation amount of an optical level for each of the wavelengths of an optical signal output from the wavelength selective switch and setting information indicating, for each of the wavelengths, whether optical level adjustment for the wavelengths of the optical signal is being carried out in another optical relay device, the wavelength selective switcher to perform a setting change of an optical level adjustment amount of the optical signal, wherein the controller excludes a wavelength, the optical level adjustment for which is being carried out by another optical relay device, from a target of the optical level adjustment.

2. The optical relay device according to claim 1, wherein the controller includes:
an optical-level-fluctuation detector to determine, for each of the wavelengths, whether optical levels of the wavelengths output from the wavelength selective switcher fluctuate;
a control-target-wavelength managing circuit to retain the setting information;
an adjustment-implementation determiner to determine, on the basis of a determination result by the optical-level-fluctuation detector and the setting information, for each of the wavelengths, whether the optical level adjustment is necessary;
a level-adjustment-amount determiner to determine the optical level adjustment amount of a waveform for which the optical level adjustment is determined as necessary by the adjustment-implementation determiner; and
a wavelength-selective-switch controller to notify transmittances of the wavelengths based on the optical level adjustment amount determined by the level-adjustment-amount determiner to the wavelength selective switcher and instruct a setting change of the optical level adjustment amount at a time when the wavelength selective switcher outputs the optical signal.

3. The optical relay device according to claim 2, wherein, when optical level fluctuation of a wavelength, the setting information of which indicates that optical level adjustment is not carried out yet in another optical relay device, is detected by the optical-level-fluctuation detector, the adjustment-implementation determiner determines that optical level adjustment of the wavelength is necessary.

4. The optical relay device according to claim 2, wherein the control-target-wavelength managing circuit acquires the setting information from an external work terminal and retains the setting information.

5. The optical relay device according to claim 2, wherein the control-target-wavelength managing circuit acquires information concerning a wavelength, for which the optical level adjustment is carried out by an optical relay device at a transmission source connected to a plurality of ports, from the other optical relay device, generates the setting information on the basis of the acquired information, and retains the setting information.

6. The optical relay device according to claim 5, wherein the control-target-wavelength managing circuit transmits information concerning a wavelength, for which the optical level adjustment is carried out by the wavelength selective switcher, to another optical relay device at a transmission destination of an optical signal output from the wavelength selective switcher.

7. The optical relay device according to claim 2, further comprising a plurality of input ports to which an optical signal output from another optical relay device is input, wherein
the control-target-wavelength managing circuit acquires information concerning wavelengths, for which the optical level adjustment is carried out by other optical relay devices connected to each of the plurality of input ports, from each of the other optical relay devices connected to each of the plurality of input ports, generates the setting information on the basis of the acquired information, and retains the setting information.

8. A control method for a wavelength selective switcher capable of performing path switching in wavelength units and optical level adjustment for each of wavelengths and incapable of receiving new setting during a setting change of a wavelength and a band transmitted through ports, and transmittance; the control method comprising:
determining, for each of the wavelengths, whether optical levels of the wavelengths output from the wavelength selective switch fluctuate;
determining, on the basis of setting information indicating, for each of the wavelengths, whether optical level adjustment for wavelengths of an optical signal output from the wavelength selective switcher is being carried out in another optical relay device and a determination result in the optical-level-fluctuation detecting, for each of the wavelengths, whether the optical level adjustment is necessary;
determining the optical level adjustment amount of a waveform for which the optical level adjustment is determined as necessary in the adjustment-implementation determining; and
notifying transmittances of the wavelengths based on the optical level adjustment amount determined in the level-adjustment-amount determining to the wavelength selective switcher and instructing a setting change of the optical level adjustment amount at a time when the wavelength selective switcher outputs the optical signal, wherein
in the adjustment-implementation determining, a wavelength, the optical level adjustment for which is being carried out by another optical relay device, is excluded from a target of the optical level adjustment.

9. An optical transmission system comprising a singularity or a plurality of the optical relay devices according to claim 1.

10. An optical transmission system comprising a pair or a plurality of the optical relay devices according to claim 5, wherein the setting information can be transmitted and received among the two or more optical relay devices.

11. An optical transmission system comprising a pair or a plurality of the optical relay devices according to claim 7, wherein the setting information can be transmitted and received among the two or more optical relay devices.

* * * * *